United States Patent
Hilgenbrink (10) Patent No.: US 10,753,087 B2
(45) Date of Patent: Aug. 25, 2020

(54) 3D FABRIC FOR FLOATING FLOOR CONSTRUCTIONS

(71) Applicant: SIKA TECHNOLOGY AG, Baar (CH)

(72) Inventor: Bernhard Hilgenbrink, Steinfurt (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/304,600

(22) PCT Filed: Apr. 29, 2015

(86) PCT No.: PCT/EP2015/059409
§ 371 (c)(1),
(2) Date: Oct. 17, 2016

(87) PCT Pub. No.: WO2015/166002
PCT Pub. Date: Nov. 5, 2015

(65) Prior Publication Data
US 2017/0044766 A1    Feb. 16, 2017

(30) Foreign Application Priority Data
Apr. 30, 2014 (EP) .................................. 14166726

(51) Int. Cl.
*E04B 5/32* (2006.01)
*E04F 15/18* (2006.01)
(Continued)

(52) U.S. Cl.
CPC ................ *E04B 5/32* (2013.01); *E04B 5/326* (2013.01); *E04B 5/48* (2013.01); *E04F 15/12* (2013.01);
(Continued)

(58) Field of Classification Search
CPC .... E04B 5/32; E04B 5/326; E04B 5/48; E04F 15/123; E04F 15/186
See application file for complete search history.

(56) References Cited

U.S. PATENT DOCUMENTS 4,123,287 A * 10/1978 Cockram .............. C03C 25/103
524/6
4,617,219 A * 10/1986 Schupack ............ B32L 313/14
428/113

(Continued)

FOREIGN PATENT DOCUMENTS

DE       102007042700 A1    3/2009
EP            0930406 A2    7/1999
EP            2754774 A1    7/2014

OTHER PUBLICATIONS

Aug. 18, 2017 Office Action issued in German Application No. 15718918.4.

(Continued)

*Primary Examiner* — Brian D Mattei
*Assistant Examiner* — Daniel J Kenny
(74) *Attorney, Agent, or Firm* — Oliff PLC (57) ABSTRACT

A floor construction on a subsurface has a screed with a reinforcement made of a 3D textile with a lower and an upper textile ply which are connected together by one or more pile threads, wherein the lower textile ply is arranged in the lower half of the screed and the upper textile ply is arranged in the upper half of the screed, wherein an insulation layer is preferably furthermore arranged between the subsurface and the screed. The reinforced screed of the floor construction allows thin screed layers with good load-bearing capacity. Good footfall sound insulation can be achieved with the floor construction containing an insulation layer.

13 Claims, 4 Drawing Sheets

(51) Int. Cl.
*E04F 15/12* (2006.01)
*E04F 15/20* (2006.01)
*E04B 5/48* (2006.01)

(52) U.S. Cl.
CPC .......... *E04F 15/123* (2013.01); *E04F 15/182* (2013.01); *E04F 15/186* (2013.01); *E04F 15/187* (2013.01); *E04F 15/203* (2013.01)

(56) References Cited

U.S. PATENT DOCUMENTS

| | | | | |
|---|---|---|---|---|
| 5,836,715 | A | * | 11/1998 | Hendrix .............. B29L 315/125 404/134 |
| 7,096,630 | B1 | | 8/2006 | Keene et al. |
| 7,504,144 | B2 | * | 3/2009 | Pott ........................ B32B 5/26 428/61 |
| 8,146,310 | B2 | | 4/2012 | Keene |
| 8,287,982 | B2 | * | 10/2012 | Brewin ................. D04B 21/16 428/86 |
| 9,187,902 | B2 | * | 11/2015 | Krasnoff ................ E04C 5/07 |
| 2005/0009428 | A1 | * | 1/2005 | Porter ................... B32L 35/02 442/129 |
| 2005/0059309 | A1 | * | 3/2005 | Tsotsis .................. B29B 11/16 442/381 |
| 2010/0047550 | A1 | * | 2/2010 | Prissok ................. C08G 18/10 428/313.5 |
| 2010/0077684 | A1 | * | 4/2010 | Socha .................... E04F 15/20 52/403.1 |
| 2010/0282539 | A1 | * | 11/2010 | Cais ....................... B32L 35/26 181/290 |

OTHER PUBLICATIONS

Oct. 16, 2014 Search Report issued in European Patent Application No. 14166726.1.
Jul. 8, 2015 International Search Report issued in International Patent Application No. PCT/EP2015/059409.
"Interior Environment", Chapter 12, International Building Code, 2006, New Jersey Edition, pp. 229-232.
Nov. 10, 2016 International Preliminary Report on Patentability issued in International Patent Application No. PCT/EP2015/059409.
Mar. 7, 2019 Office Action issued in Australian Application No. 2015254624.
Nov. 14, 2018 Office Action issued in Australian Application No. 2015254624.

* cited by examiner

3D FABRIC FOR FLOATING FLOOR CONSTRUCTIONS

TECHNICAL SECTOR

The invention relates to a floor structure with a screed reinforced by a 3D textile, to a process for the production of the floor structure, and to the use of the 3D textile as reinforcement system for a screed.

PRIOR ART

Conventional screeds for the construction industry and use thereof are described in the standards DIN EN 13318 and DIN 18560. These are layers laid directly on the substrate, with or without bonding, or laid on an intervening separating layer or intervening insulation layer.

Screeds bonded to the substrate require a robust stable substrate and a layer thickness of at least 10 mm. Unbonded screeds laid on a separating layer, for example a two-ply polyethylene film, require a robust substrate and a layer thickness of at least 30 mm. Floating screeds on soft layers for acoustic insulation and/or for thermal insulation have a minimal thickness of 30 mm, or of at least 40 to 45 mm, depending on the binder used, when ceramic tiles are used as floorcovering. In the case of renovation work, the loadbearing properties of the structure are often not designed for such loads and layer thicknesses.

For older buildings, in particular multiple-occupancy residential buildings, there can be a requirement, for example, for renovation with respect to impact-sound insulation (cf. 2006 International Building Code Chapter 12 interior environment section 1207 sound transmission). There are only a limited number of solutions marketed for this purpose. Structures made of a thin impact-sound-insulation ply with a floating screed thereabove are described by way of example in U.S. Pat. No. 7,096,630 B1 and U.S. Pat. No. 8,146,310 B2.

Commercially available products suitable as impact-sound-insulation layers for this purpose are by way of example Weber.floor® 4955 from Weber Saint Gobain, Germany, and Quiet Qurl® RF products from Keene Building Products, USA.

These structures made of impact-sound-insulation layer and of floating screed have the disadvantage that the installation height required is generally at least about 3 to 4 cm (insulation layer thickness+at least about 2.5 cm screed layer thickness). Structures of this type suitable for residential buildings use very thin insulation layers, allowing reduction of screed thicknesses used. However, there is then limited protection from impact sound. If thicker layers are required for sound deadening, or if the floor has to be designed for relatively high loads, relatively thick screed layers have to be laid in order to obtain sufficient robustness.

The height of the structure can lead to problems with previously installed systems, e.g. with door heights, heating equipment such as heaters, floor drains, wash basins, or the distance between floor and ceiling.

Screed is moreover heavy. The load resulting from a cement floor of thickness 3 cm is by way of example above 60 kg/m². That can be too much for old wood floors. However, a thinner structure does not provide the flexural tensile strength required for the traffic load specified for residential buildings. Compliance with more stringent requirements requires relatively thick insulation layers and relatively thick screed layers.

Another solution combines impact-sound-insulation layer and dry board. Dry board used can be fiber-reinforced gypsum plasterboard or wooden board, for example particle board or OSB. This type of combination can be installed with relatively low thickness. However, disadvantages are a low level of acoustic insulation and limited loadbearing properties. Systems of this type cannot achieve the traffic load required for offices and commercial buildings. Here again, improved insulation can be achieved by using thicker acoustic insulation layers. For relatively high loads it is necessary to use thicker dry board to provide adequate loadbearing properties. However, thicker acoustic insulation layers and thicker dry board in turn cause problems with the weight and thickness of the entire structure.

Various insulation materials are conventionally used as insulation layers in floor structures. By way of example, mineral wool is fire-resistant and improves thermal insulation and acoustic insulation. It is therefore used in structures in buildings. Products of this type can be obtained by way of example from Rockwool International A/S, Denmark, Saint Gobain Isover G+H AG, Germany, or Ursa Deutschland.

Examples of other materials used for sound-deadening and to some extent for thermal insulation are PE foam, foamed rubber, resilient polyurethane, for example rigid polyurethane foam, latex foam, nonwoven fabrics, and felts made of organic fibers. These insulation materials are not fire-resistant, and can be used only when there is no requirement for fire-resistant properties. Examples of companies supplying insulation products made of these materials are Keenebuildings, Abrobo Sweden, Ball & Young Ltd. GB, Interfloor Ltd. GB with trademark TREDAIRE, and Duralay.

These insulation materials, inclusive of mineral wool, form soft layers, and therefore require installation of a load-distribution layer. The required layer thickness depends on the traffic load. Screed or dry board is used as load-distribution layer. Here again, there is the problem that the screed has to be laid with a thickness of more than one cm. Although dry board can be used with low thickness, load-bearing properties are then limited.

EP 2754774 A1 relates to an intermediate layer for a covering structure, comprising a first layer in the form of mesh, where there is a second layer arranged on one side, and where there can be a third layer in the form of mesh present on the other side of the first layer, connected by way of spacers to the first layer.

DE 102007042700 A1 relates to a process for the production of a screed which has a mesh reinforcement system positioned by way of spacers, where a second mesh structure can be arranged in the second layer half. In one embodiment there can be spacers separating the two mesh structures.

EP 0930406 A2 relates to an underfloor with a loadbearing layer, an insulation layer and, laid thereon, a separating ply on which there is a screed arranged, where the separating ply can be a nonwoven fabric, a woven fabric, a knitted fabric, or paper.

DESCRIPTION OF THE INVENTION

The object of the invention consisted in solving the abovementioned problems in the prior art. In particular, the object consisted in the provision of a floor structure where the thickness of the floor structure can be minimized, depending on the loadbearing properties required. In particular, this type of low-thickness and low-weight floor structure should also be achievable for floor structures comprising insulation layers. A further intention is that the system can also be used in a simple manner for renovation work.

Surprisingly, it has been found that these problems could be solved by using a screed reinforced with a 3D textile.

Accordingly, the invention provides a floor structure on a substrate comprising a screed with a reinforcement system made of a 3D textile with a lower and an upper textile ply connected to one another by one or more pile filaments, where the lower textile ply is arranged in the lower half of the screed and the upper textile ply is arranged in the upper half of the screed. It is preferable that the floor structure is a structure for an indoor floor.

The floor structure of the invention can provide a screed layer that is very thin in relation to the loadbearing properties obtained. It is thus possible to reduce installation height and/or to use thicker insulation layers. The relatively low thickness and the use of a low-weight reinforcement system provide low intrinsic weight. The low layer thickness also leads to shorter drying times.

Furthermore, by virtue of the 3D textile the textile plies serving as reinforcement system are automatically correctly positioned. Positionally accurate installation is particularly advantageous because this is not generally possible with conventional reinforcement systems. It is thus possible to install the screed in a single operation and the time required for operations is thus reduced. The floor structure is suitable both for new construction work and for renovation.

The invention also provides a process for the production of the floor structure, and also the use of the 3D textile as reinforcement system in a screed in a floor structure. The preferred embodiments of the invention are set out in the dependent claims. The invention is explained in detail below.

BRIEF DESCRIPTION OF THE DRAWINGS

FIG. 6 shows a schematic cross-section of the substrate (10) on which a screed (2) is provided. In the screed, a 3 D textile is embedded, where the lower textile ply (4) is arranged in the lower half of the screed and the upper textile ply (5) is arranged in the upper half and upper third, respectively, of the screed (pile filaments 6 of the 3D textile are not visible). Under the lower textile ply (4) a sheet material (7) is secured.

METHODS FOR IMPLEMENTATION OF THE INVENTION

Terms used in connection with screeds are explained in DIN EN 13318:2000-12. Reference is made thereto unless otherwise stated. "3D" is used here in the conventional way as abbreviation for three-dimensional.

The pile filament connects the textile plies, composed by way of example of weft and warp, and provides spacing between said plies, and thus, with the textile plies, forms a three-dimensional structure where the textile plies are arranged with spacing from one another and in essence parallel to one another. Another term used for pile filaments is spacer filaments.

A suitable substrate for the floor structure is in principle any of the conventional supportive substrates, for example concrete, metal, wood, tiles, asphalt, or existing synthetic-resin-coating systems or screeds. Metal substrates are used by way of example in shipbuilding. The substrate can have been pretreated in a conventional manner, e.g. by grinding, sandblasting, caustic treatment, primer coating, and/or scratchwork coating.

The floor structure of the invention comprises a screed with a reinforcement system made of a 3D textile. The 3D textile has two textile plies connected to one another by one or more pile filaments. Preference is given to a woven 3D fabric. These 3D textiles are also termed biaxial 3D textiles or biaxial 3D woven fabrics, or biaxial 3D flat-woven fabrics. Other terms for 3D textiles are spacer textiles and woven spacer fabrics.

Figure 6:
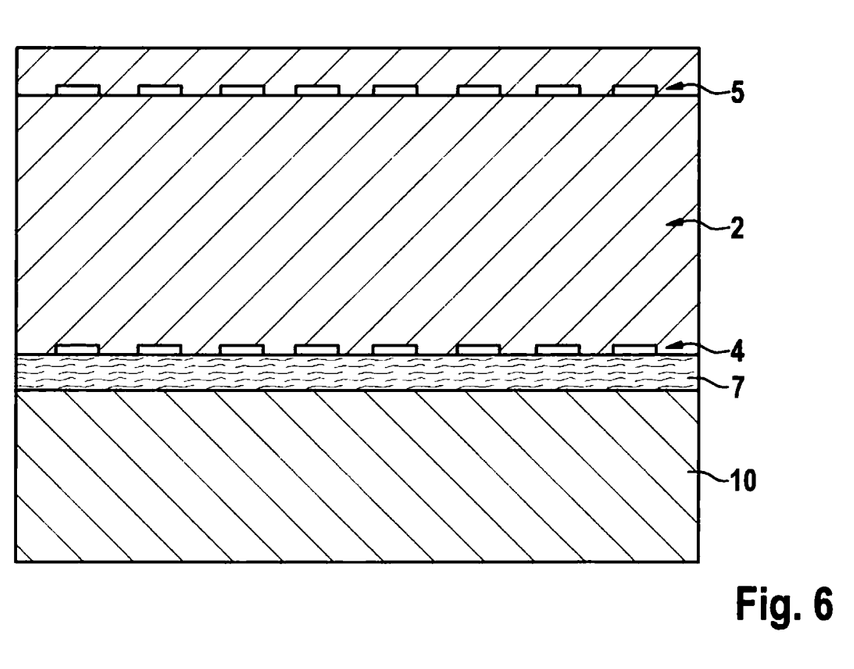

FIG. 6 shows a schematic cross-section of the substrate 10 on which a screed 2 is provided. In the screed, a 3 D textile is embedded, where the lower textile ply 4 is arranged in the lower half of the screed and the upper textile ply 5 is arranged in the upper half and upper third, respectively, of the screed (pile filaments 6 of the 3D textile are not visible). Under the lower textile ply 4 a sheet material 7 is secured.

The textile plies are flat/biaxial. The two textile plies of the 3D textile can be identical or different, and are parallel to one another. They are generally identical textile plies. The textile plies are preferably self-supporting. The two textile plies form a twin-ply reinforcement system in the screed, where the position of the reinforcement system can be adjusted/predefined by virtue of the separation of the textile plies from one another.

The terms lower and upper textile ply of the 3D textile refer to the position of the respective textile ply as reinforcement system in the screed, where naturally the lower textile ply is arranged closer to the substrate than the upper textile ply. Statements relating to the textile ply here refer to both the lower and the upper textile ply unless expressly otherwise stated.

The textile plies can by way of example be a woven fabric, a biaxial mesh, or a laid scrim. It is preferable that the textile plies are a woven fabric or a biaxial mesh.

The textile plies are composed of fibers/strands of fibers. It is preferable that the fibers are inflexible or have low flexibility. Examples of suitable fibers are fibers made of glass, basalt, organic polymer, or carbon, and combinations thereof, preference being given here to glass fibers. Examples that may be mentioned of organic polymer fibers or synthetic fibers are polyethylene terephthalate fibers and in particular aramid fibers. Examples of suitable glass fibers are alkali-resistant AR glass fibers. The glass fibers can by way of example be used in the form of glass rovings.

The absorption of force by, or reinforcing effect of, the textile plies can by way of example be adjusted via the type, density, quantity, and angular positioning of the fiber structure.

The fibers, in particular glass fibers, can optionally have been provided with a protective layer. The protective layer can by way of example be useful for protecting the fibers from chemical attack from components used for the screed, as required by the nature of the fibers and the nature of the screed components. The fibers, in particular the glass fibers, can by way of example have been provided with a protective layer made of a polymer composition, e.g. an epoxy resin, a latex, an acrylate resin, an acrylate dispersion, or a polyurethane, preference being given here to acrylate resins/acrylate dispersions, where these can by way of example form an alkali-resistant film on the textile.

The two textile plies are bonded to one another by one or more pile filaments, and it is therefore possible to obtain a pressure-resistant connection between the two textile plies. The pile filaments used are usually made of relatively flexible fibers, e.g. of polyester. The pile filament(s) serve(s) to bond the two textile plies, and serve as spacers between the two textile plies.

An advantage of the 3D textile is therefore that the distance between the two textile plies can be adjusted as required. The distance between the two textile plies, or the thickness of the 3D textile used, naturally depends here on the thickness of the screed. The distance between the textile plies is generally at least 3 mm, preferably at least 4 mm. The distance between the two textile plies of the 3D textile can by way of example be in the range from 4 to 35 mm, preferably from 5 to 28 mm, and more preferably from 10 to 15 mm. The distance between the two textile plies is in particular the same as, or less than, the thickness of the screed.

The absorption of force by, and/or compressive strength of, the 3D textile can be adjusted via the nature, quantity, density, and angular positioning of the pile filaments. The 3D textile is preferably resilient. When the 3D textile is laid on the floor and a person passes thereover, the 3D textile is compressed temporarily by the load, but once the load has been removed reverts to the original structure. This is advantageous because during the installation of the 3D textile and the subsequent installation of the screed an installer can move freely on the 3D textile without damaging same.

Figure 1A:
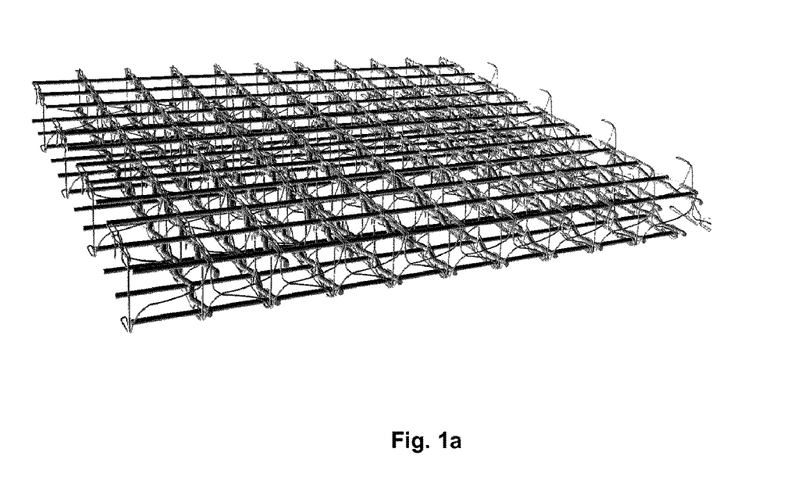
FIGS. 1a and 1b show two different views of a 3D textile suitable for the invention.
Figure 1B:
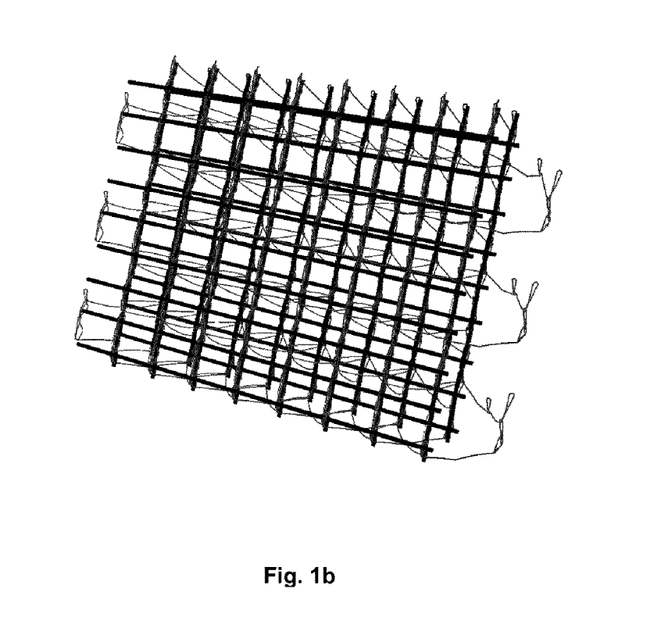

FIGS. 1a and 1b show a 3D textile suitable for the invention. 3D textiles are obtainable commercially, e.g. from V. Fraas Solutions in Textile GmbH, Germany, e.g. with trademark Sitgrid®. The 3D textiles can take the form of sheets or webs or rolled webs.

The arrangement of the 3D textile in the screed in the floor structure is such that the textile ply located closer to the substrate, i.e. the lower textile ply, is arranged in the lower half of the screed and the upper textile ply is arranged in the upper half of the screed. It will be self-evident that lower and upper half refer to the layer thickness of the screed. By way of example, if the layer thickness of the screed is 10 mm the lower half of the screed occupies layer heights from 0 to less than 5 mm and the upper half of the screed occupies layer heights of more than 5 to 10 mm. Correspondingly, the lower quarter of this screed would occupy layer heights from 0 to 2.5 mm, and the upper quarter would occupy layer heights from 7.5 to 10 mm.

The lower textile ply is preferably arranged in the lower third of the screed, more preferably in the lower quarter of the screed. The upper textile ply is preferably arranged in the upper third of the screed, more preferably in the upper quarter of the screed. In particular, the upper and lower textile ply are bonded or embedded within the screed material or sheathed by the screed material.

In a preferred embodiment, the location of the lower textile ply is at the bottom of the screed. It is moreover preferable that the upper textile ply is arranged at or near the upper surface of the screed. The location of the upper textile ply can be directly at the upper surface of the screed but it is preferable, for reasons of appearance and in order to obtain a smooth surface, that it is covered by the screed. The arrangement of the upper textile ply is preferably such that the extent of the screed layer remaining above the upper textile ply is from 0 to 5 mm or 0 to 4 mm, preferably from 0 to 3 mm, and particularly preferably from 0.5 to 3 mm. It would be self-evident that all of the abovementioned preferred positions also apply to the upper and lower textile plies in combination with one another.

Figure 2A:
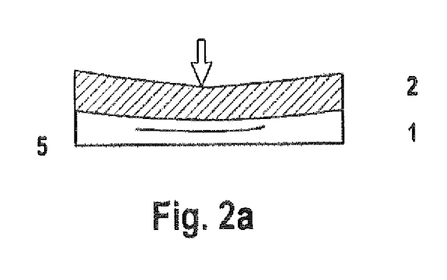
FIGS. 2a and 2b are diagrams showing the reinforcement effect in the floor structure for central and marginal load.
Figure 2B:
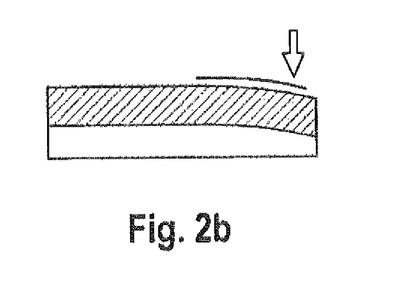

The reinforcement system in the lower and in the upper region of the installed screed markedly improves the reinforcement of the structure. FIGS. 2a and 2b (3D textile not depicted) show diagrams of the reinforcement effect of the reinforcement system of the invention when a screed 2 is arranged above a soft layer such as an insulation layer 1. When the structure is loaded in the center (FIG. 2a), the lower reinforcement system or textile ply is subjected to stress and absorbs the force. When the structure is loaded at the edge or at a corner (FIG. 2b), the upper reinforcement system or textile ply is subjected to stress and absorbs the force. The lines in FIGS. 2a and 2b show the reinforcement provided by the reinforcement plies diagrammatically, and have been shifted somewhat out of the screed layer in order to improve visibility.

Since the density of the 3D textile is lower than that of the materials used for the screed, the textile floats to some extent when the screed is installed, and this can lead to an uneven surface. In a preferred embodiment, the 3D textile is therefore, for example by adhesion or by use of tacks, fixed on a ply or layer situated thereunder in the floor structure before the 3D textile is filled with the material for the screed. It is thus possible to avoid floatation of the 3D textile.

In a particularly preferred embodiment, a sheet material is secured on one of the textile plies of the 3D textile, this being the ply that represents the lower textile ply in the floor structure. The flat material can be secured on the textile ply in a conventional manner, e.g. via contact, use of tacks, or adhesion, preference being given here to adhesion. By way of example, a dispersion adhesive is suitable for the adhesive bonding process.

The flat material can by way of example take the form of sheet, web, board, film, or mat. The flat material can be made of any desired material. It can by way of example be a flat material usually used as separating layer or separating ply in floor structures of this type. The flat material can by way of example be plastics film, paper, for example bitumen-saturated paper, or nonwoven fiber fabric, preference being given here to nonwoven fiber fabric. Examples of preferred nonwoven fiber fabrics are unfinished or other glass nonwovens, and polymer fiber nonwovens, e.g. made of polyester, polyamide, polyethylene (PE), polypropylene (PP), PE/PP copolymers or mixtures thereof. Particularly good results are achieved with polypropylene fiber nonwovens, e.g. TYPAR® SF 20 from DuPont, fiber nonwoven made of thermally consolidated continuous PP fibers with weight per unit area 68 g/m².

Figure 3:
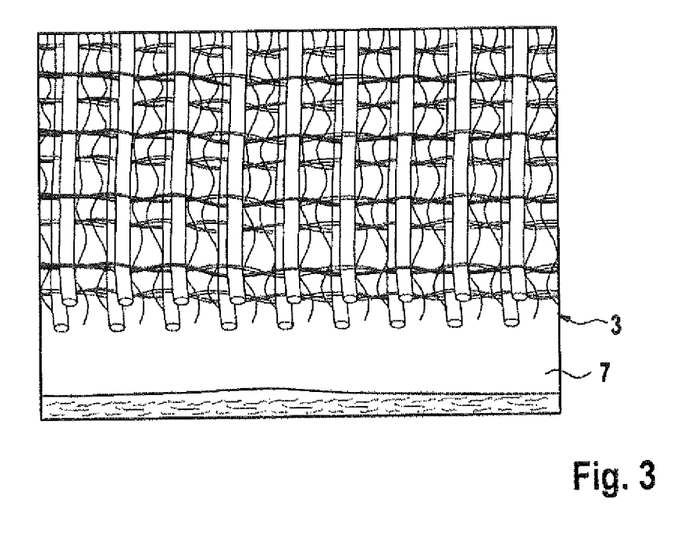
FIG. 3 shows a 3D textile with a nonwoven fiber fabric adhering on one textile ply.

Nonwoven fiber fabrics are particularly suitable as flat material because they are robust, and there is therefore reduced risk of damage during securing and subsequent installation. Nonwoven fiber fabrics can moreover be secured effectively and robustly on the textile ply, for example by adhesion. The weight per unit area of the nonwoven fiber fabric is preferably from 20 to 200 g/m², more preferably from 30 to 80 g/m². FIG. 3 shows a woven 3D fabric with a nonwoven fiber fabric adhesive-bonded on a textile ply.

When the 3D textile, with the flat material secured on the lower textile ply, has been laid onto the substrate, or on a layer located on the substrate, with the flat material downward, and then the material for the screed is applied, the high-density material flows through the 3D textile onto the flat material secured thereto, and thus forces the 3D textile onto the layer situated thereunder. The 3D textile does not therefore float, and a screed with a smooth surface is obtained. It is thus possible, in a single step, to apply a screed which, without further pretreatment, can be covered with a conventional floorcovering. Securing of the flat material under the lower textile ply also ensures that the lower textile ply is arranged at the bottom of the screed.

Figure 4A:
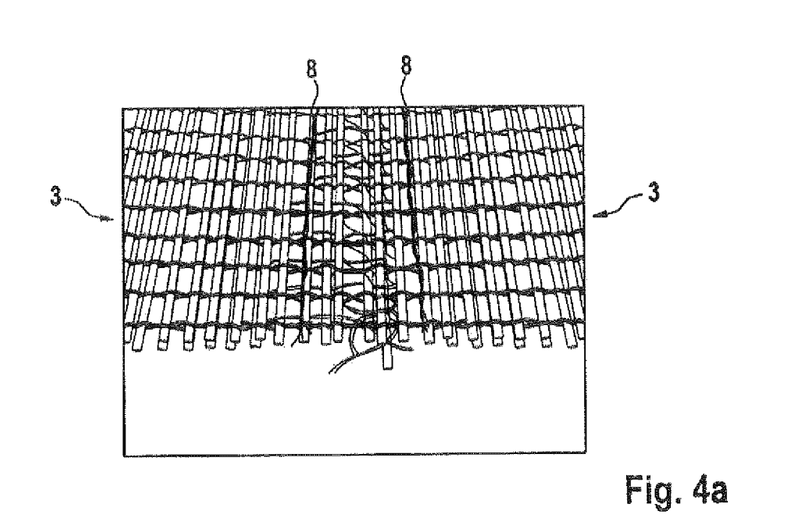
FIGS. 4a-c show possible embodiments for overlapping regions of two adjacent 3D textiles.
Figure 4B:
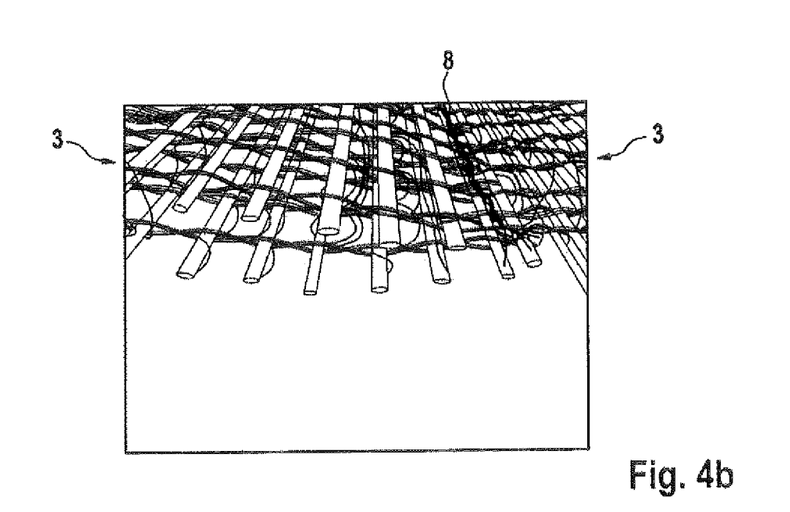
Figure 4C:
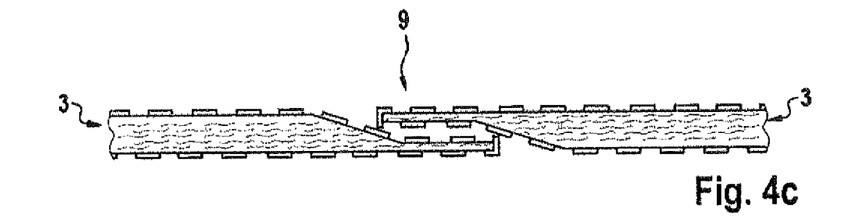

For overlapping of the 3D textiles adjacent to one another it is possible to bond the 3D textiles, e.g. via hot-melt adhesive bonding or other adhesive bonding, or by stitching (FIGS. 4a and 4b). In another method, the pile filament(s) are not attached between the textile plies at the edges of the 3D textile, or are removed. It is thus possible to retain, in the overlap region, the same height as in the entire 3D textile. FIG. 4c shows an overlap region of this type for two adjacent 3D textiles.

The 3D textile is embedded into a screed in the floor structure, as reinforcement system. By virtue of the reinforcement system used, the screed can be extremely thin in relation to the loadbearing capability achievable therewith. The layer thickness of the screed is by way of example from 5 to 40 mm, preferably from 5 to 25 mm, and particularly preferably from 10 to 15 mm.

The screed reinforced in the invention can be used in the types of screed structures that are generally conventional. The reinforced screed can by way of example be a bonded screed, an unbonded screed, or a floating screed. In the case of the bonded screed, the screed is bonded to the supportive substrate. In the case of the unbonded screed, the screed is not bonded to the supportive substrate. The unbonded screed can be a screed on a separating layer, where the screed is laid on a separating layer which has been laid on the substrate. The unbonded screed can be a floating screed where the screed is laid on an insulation layer arranged above the substrate. A floating screed is usually completely separate from all rising components, e.g. walls or pipes.

In a preferred embodiment, the screed reinforced in the invention is a floating screed on an insulation layer. By way of example, compressible plastics strips can be used as edge delimitation, e.g. at the walls. In order to avoid ingress of water and screed material such as cement slurry into the insulation layer, the latter can be covered with a separating layer, e.g. a film such as a polyethylene film, before installation of the screed.

Any conventional screed material can be used for the screed. It is possible by way of example to use a mortar such as a screed mortar or a troweling composition. The screed material, in particular the mortar or the troweling composition, is preferably a self-leveling screed material. The screed material, such as mortar or troweling composition, is preferably flowable during use.

The screed material, in particular mortar or troweling composition, comprises a binder. It is possible to use any of the conventional binders. Examples of suitable binders are cement, such as Portland cement or alumina cement, anhydrite binders, reactive resins, such as epoxy resin, polyurethanes, and SMP (silane-modified polymers), and combinations of these binders. Other possible binders are mastic asphalt, magnesia, bitumen-emulsion-cement mixtures, and calcium sulfate.

In the case of the reactive resins, which often take the form of two- or multicomponent systems, hardening occurs via chemical reaction of the components. In the case of the inorganic binders, hardening usually occurs via the reaction that takes place when the tempering water is added.

The screed material, in particular the mortar or the troweling composition, can comprise other additives, in particular aggregates, e.g. sand or silica, or optionally hard materials or reinforcing fibers, e.g. glass fibers, and also optionally one or more admixtures. Examples of admixtures are air-pore formers, plasticizers, flow agents, and retardants. Flow agents or plasticizers are suitable for, by way of example, increasing the softness or flowability of the screed material. It is also possible to add colorants, such as pigments, to the screed material in order to obtain a colored screed.

The resultant reinforced screed is by way of example a cement screed, a synthetic-resin-modified cement screed, a bitumen emulsion screed, a synthetic resin screed, a calcium sulfate screed, a mastic asphalt screed, a magnesia screed, or an anhydrite screed, preference being given here to cement screeds, synthetic-resin-modified cement screeds, synthetic resin screeds, calcium sulfate screeds, and anhydrite screeds. It is preferable to use a flowable screed.

In a particularly preferred embodiment, the floor structure comprises, as already mentioned, an insulation layer arranged between the substrate and the reinforced screed. The insulation layer can be a single-ply, two-ply, or multiple-ply layer. The insulation layer is by way of example applied in the usual manner directly onto the substrate. However, it is optionally possible by way of example to arrange one or more separating plies or separating layers between substrate and insulation layer.

An advantage of the invention is, as already explained, that the screed can be very thin. The entire floor structure can thus be relatively thin. This height saving can also be utilized at least to some extent in order to incorporate a thicker insulation layer, in order to achieve better acoustic insulation and/or better thermal insulation, and/or better fire protection.

The insulation layer can be incorporated by way of example in the form of sheets, mats, or webs made of suitable insulation materials. As already explained above, it is optionally possible to apply an insulation layer covering above the insulation layer in order to avoid ingress of water and screed material into the insulation layer. The insulation layer covering can be a separating layer such as a film, e.g. a polyethylene film.

The insulation layer is a conventional layer in floor structures of this type, and serves for acoustic insulation and/or thermal insulation, and/or for fire protection. For fire protection it is necessary to use fire-resistant materials, e.g. mineral wool. An important function of the insulation layer is often impact-sound insulation.

Examples of suitable insulation materials for insulation layers of this type are PE foam, foamed rubber, resilient polyurethane, for example polyurethane foam, latex foam, nonwoven fabrics and felts made of organic fibers, polystyrene foam (EPS), mineral wool, for example rock wool or glass wool, and softwood fiber board. Mineral wool is particularly preferred. Mineral wool is fire-resistant, and therefore also provides fire protection. The insulation layer is preferably a mineral wool insulation layer.

The floor structure can moreover comprise a floorcovering above the screed and/or at least one separating layer, and/or a floor-heating system, in particular an indoor-floor-heating system. The resultant screed can have a smooth surface and is optionally suitable, without further modification, as top layer for the floor. However, the usual procedure also applies a floorcovering on the screed. It is possible to use any of the conventional floorcoverings, e.g. ceramic coverings, natural stone coverings, parquet floorcoverings, or other floorcoverings.

The floor structure can, if desired, comprise a floor-heating system, in particular an indoor-floor-heating system. This can be arranged in a conventional manner under the screed, preferably between insulation layer and screed, or above the screed, preferably between screen and floorcovering. It is preferably an electrical floor-heating system, in particular, an electrical indoor-floor-heating system. By way of example here, electrical cables or resistor conductors, or films with incorporated electrical cables or resistor conductors are arranged below the screed, preferably between insulation layer and screed, or above the screed, preferably between screed and floorcovering. This can be achieved in a conventional manner, in that by way of example the electrical floor-heating system is laid onto the insulation layer, and then the reinforced screed is laid as described above, or in that said heating system is laid onto the laid reinforced screed, and then the floorcovering is laid.

In a particularly preferred embodiment, the floor structure comprises, on a substrate, a screed with a reinforcement system made of a 3D textile with a lower and an upper textile ply connected to one another by one or more pile filaments, where a flat material, preferably a nonwoven fiber fabric, has been secured on the lower textile ply, and the lower textile ply is arranged at the bottom of the screed, and the upper textile ply is arranged in the upper half of the screed, preferably in the upper quarter of the screed, where an insulation layer, preferably a mineral wool insulation layer, is arranged between the substrate and the reinforced screed.

The floor structure can also comprise one or more separating layers or separating plies. Examples of useful positions in the floor structure and their function have been explained above. Examples of separating plies or separating layers commonly used are plastics films, for example polyethylene films, paper, for example bitumen-saturated paper, and nonwoven fiber fabrics, for example unfinished glass nonwovens.

The floor structure is preferably indoor floor structure. The floor structure is in particular suitable for residential buildings, public buildings, industrial buildings, and commercial buildings, or ships.

The invention also provides a process for the production of a floor structure on a substrate as explained above. The process comprises a) laying of the 3D textile on the substrate or on a layer located above the substrate, and b) filling of the 3D textile with a screed material and hardening to form the reinforced screed. The statements made above in relation to the floor structure apply correspondingly to the process.

The screed material is preferably a mortar or a troweling composition, and is preferably self-leveling. As explained above, the screed material is generally prepared by mixing of the components in the case of reactive resins, and/or addition of water. The screed material is preferably flammable. The fresh screed material (fresh mortar), while it remains in a form amenable to use, is applied to the laid 3D textile, preferably by pouring, and thus fills the 3D textile. The 3D textile is thus embedded in the screed material. Hardening of the screed material provides the reinforced screed on the substrate or on the layer located above the substrate.

When the reinforced screed is laid directly on the substrate, a bonded screed is obtained. It is possible to place at least one separating layer, for example a film, on the substrate before the screed is laid. In this case a reinforced screed is obtained on a separating layer.

It is preferable that, before the 3D textile is laid, an insulation layer is laid onto the substrate or on a layer, such as a separating layer, located above the substrate; it is preferable that it is laid directly on the substrate. An insulation layer covering is optionally arranged onto the insulation layer. The reinforced screed is then laid onto the insulation layer, which optionally has the covering. In this case, a floating screed is obtained on the insulation layer.

In a preferred process, as explained, a flat material, in particular a nonwoven fiber fabric, is secured on the lower textile ply of the 3D textile. It is preferably secured by adhesion, e.g. by a dispersion adhesive. The textile ply can be secured to the flat material in that the flat material is laid on the substrate, the separating ply, or the insulation layer, and then the 3D textile is secured thereon by way of the lower textile ply. It is preferable that the flat material is secured in advance on a textile ply of the 3D textile and that the 3D textile is then laid, with the flat material secured thereto downward, onto the substrate, the separating layer, or the insulation layer.

The invention also provides the use, as reinforcement system in a screed in a floor structure, of a 3D textile with two textile plies connected to one another by one or more pile filaments. The above statements relating to the floor structure apply correspondingly to the use.

The invention is explained in more detail below via examples which, however, are not intended to restrict the invention in any way.

EXAMPLES

Example 1

Usage Test

The experiment used a 3D textile as in FIG. 1a/1b, which had a nonwoven fiber fabric adhesive-bonded on one of its textile plies, as in FIG. 3. The thickness of this woven 3D fabric is 12 mm, and its weight per unit area is about 700 g/m$^2$. The two textile plies were woven glassfiber fabrics. The material, density, and nature of the upper and lower woven glassfiber fabrics here were identical. A nonwoven fiber fabric was adhesively bonded on one woven glassfiber fabric, and the following structure was thus obtained: nonwoven polypropylene fiber fabric, 68 g/m$^2$, 1 mm woven glassfiber fabric adhesive-bonded thereto, 10 mm of intermediate space maintained by pile filaments, and 1 mm woven glassfiber fabric on the upper side.

Figure 5:
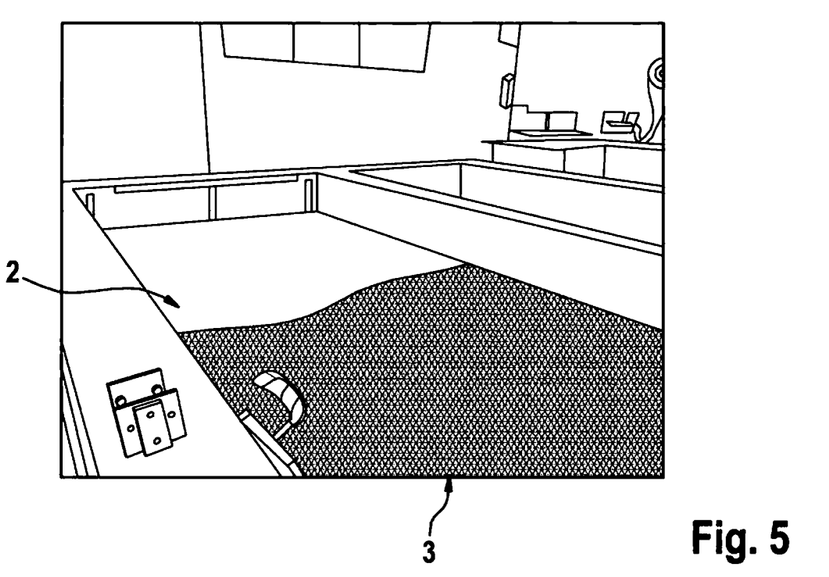
FIG. 5 shows an intermediate stage in the production of the floor structure of the invention.

A floor structure was laid in a room measuring 2×4 m in order to test loads such as those that can be caused by a heavy bookcase in one corner in the room. An insulation layer providing insulation from impact sound (mineral wool sheets of thickness 12 mm from Rockwool) was laid on the substrate and along the walls. The edges and joints between the sheets were adhesive-bonded with a pressure-sensitive adhesive tape in order to prevent the self-leveling screed material from flowing between the sheets. The woven 3D fabric described, which had the nonwoven fiber fabric adhesive-bonded on one of its textile plies, was laid, with the nonwoven fiber fabric downward, onto the insulation layer. A fiber-reinforced troweling composition with calcium sulfate as binder and mixed with water (Schönox® APF from Schönox GmbH, Germany) was then poured onto the structure, and the 3D textile was filled therewith. The thickness of the screed obtained after hardening was about 14 mm, and its surface was smooth. FIG. 5 shows an intermediate stage during the production process, where the 3D textile is already to some extent filled with, or embedded in, the screed material.

The hardened screed was subjected to a load test at the corners of the room. For this, 10 days after the production process, a wooden board was placed on 4 metal cylinders (pressure area $4\times706$ mm$^2$) at one corner and loaded with 100 kg. After 1 h, the weight was increased to 200 kg, after another hour it was increased to 300 kg, and after another hour it was finally increased to 500 kg. The resultant load was 17.0 kN/m$^2$. During the load test, the deformation of the screed was determined in mm/m by using a sensor. The deformation of the surface was at most 2.5 mm/m. No cracking was observed.

Example 2

Example 1 was repeated, except that a cement-based troweling composition (Schönox® FPL Plus from Schönox GmbH, Germany) was used instead of the screed material Schönox® APF. This gave a smooth surface. Load tests were carried out as described in example 1, and deformation values obtained here were similar to those obtained in example 1.
Test of Insulation with Respect to Solid-Borne Sound Example 3

A floor structure was laid on a test area of about 1 m$^2$. Mineral wool, 0.92 kg/m$^2$ (Isover akustik®), thickness 15 mm, was first applied to the test area. A screed (screed material: Schönox® APF), 30.94 kg/m$^2$, reinforced with a woven 3D fabric, was laid thereon. It was laid in unbonded form. The screed was slightly dished to 8 mm, and loaded with about 110 kg.

Attenuation of impact sound was tested in accordance with ISO 10140:2010 (all parts), category II. The test determines attenuation of transmitted impact sound due to a material installed on a high-mass reference ceiling. Other standards on which the test is based are EN ISO 717:2013-06 and DIN 18560:2009-09.

The test area differs from the requirement of category II. The air temperature and humidity in the emitting room and receiving room were 20° C. and 56%. The table below gives the results.

Example 4

Example 3 was repeated, except that the mineral wool used in example 3 was replaced by mineral wool, 2.20 kg/m$^2$ (Isover akustik®), thickness 30 mm. Attenuation of impact sound was measured as in example 3. The table below gives the results.

|  | Example 3 | Example 4 |
| --- | --- | --- |
| Attenuation of impact sound $\Delta L_w$ | 23 dB | 28 dB |
| Attenuation of impact sound $\Delta L_{lin}$ | 10 dB | 15 dB |
| $C_{I,\Delta}$ | −13 dB | −13 dB |
| $C_{I,r}$ | 2 dB | 2 dB |
| $C_{I,r,50-2500}$ | 4 dB | 6 dB |

The results show excellent attenuation of impact sound by the floor structures of the invention.
Load Test Example 5

A floor structure was laid as in example 1 with the following exceptions: the floor structure was laid on an area measuring $30\times30$ cm. The thickness of the screed layer was 15 mm. Mineral wool (Isover Akustik®), thickness 15 mm, was used as insulation layer.

Comparative Example

Example 5 was repeated, except that the woven 3D fabric was not incorporated into the screed.
Load Test The floor structures of example 5 and of the comparative example were subjected to a load test. Behavior with respect to impression was tested 14 d after production of the structure. The test used a rectangular impression head measuring $40\times10$ mm. The structures were loaded centrally, at the edge, and in the corner. The test was terminated when the force decreased and/or when a discernible crack occurred, and the test head then penetrated into the material. The table below collates the results.

| Structure tested/ Position of load | Maximum force in kN | Deformation in mm prior to fracture | Compressive strength in N/mm$^2$ |
| --- | --- | --- | --- |
| Ex. 5, central | 8.3 | 12.9 | 20.8 |
| Ex. 5, edge | 9.0 | 12.0 | 22.6 |
| Ex. 5, corner | 3.2 | 10.6 | 8.1 |
| Comp. ex., central | 1.1 | 5.7 | 2.7 |
| Comp. ex., edge | no test possible | disintegration |  |
| Comp. ex., corner | no test possible | disintegration |  |

The floor structure of example 5 of the invention exhibits significantly better loadbearing properties in comparison with the floor structure of the comparative example.

REFERENCE LIST

1 insulation layer
2 screed
3 3D textile
4 lower textile ply
5 upper textile ply
6 pile filament
7 nonwoven fiber fabric
8 stitches
9 overlap region
10 substrate

What is claimed is:

1. A substrate with a floor structure thereon, the floor structure comprising a screed with a reinforcement system made of a 3D textile with a lower and an upper textile ply bonded to one another by one or more pile filaments, wherein the upper and the lower textile ply are embedded within the screed, and the lower textile ply is at the bottom of the screed and the upper textile ply is arranged in the upper half of the screed, wherein secured by tack or adhesion under the lower textile ply there is a sheet material,
   wherein the substrate with the floor structure thereon is obtained by a process, comprising the following steps:
   a) laying of the 3D textile with the sheet material secured under the lower textile ply of the 3D textile on top of the substrate or on a layer located above the substrate, and then b) filling of the 3D textile having been laid on the substrate or on the layer located above the substrate with a fresh screed material, and hardening to form the reinforced screed.

2. The substrate as claimed in claim 1, wherein between the substrate and the screed an insulation layer is arranged.

3. The substrate as claimed in claim 1, wherein the screed is a bonded screed, an unbonded screed, or a floating screed.

4. The substrate as claimed in claim 1, wherein the location of the upper textile ply is in the upper third of the screed.

5. The substrate as claimed in claim 1, wherein the layer thickness of the screed is from 5 to 40 mm.

6. The substrate as claimed in claim 1, wherein the upper and lower textile ply are a woven fabric, a biaxial mesh, or a laid scrim.

7. The substrate as claimed in claim 1, wherein the upper and lower textile ply are composed of fibers made of glass, basalt, organic polymer, aramid, or carbon.

8. The substrate as claimed in claim 1, wherein the upper and lower textile ply are composed of fibers provided with a protective layer.

9. The substrate as claimed in claim 1, which additionally comprises a floorcovering above the screed, and/or comprises at least one separating layer and/or comprises a floor-heating system, which is below or above the screed.

10. The substrate as claimed in claim 1, which is adapted for residential buildings, public buildings, industrial buildings, and commercial buildings, or for ships.

11. A process for the production of a floor structure on a substrate as claimed in claim 1, comprising the following steps:

a) laying of the 3D textile with the sheet material secured under the lower textile ply of the 3D textile, on the substrate or on a layer located above the substrate, and then b) filling of the 3D textile having been laid on the substrate or on the layer located above the substrate with a fresh screed material, and hardening to form the reinforced screed.

12. The process as claimed in claim 11, wherein before the laying of the 3D textile, an insulation layer is laid on the substrate or on a layer located above the substrate.

13. The substrate as claimed in claim 1, wherein the sheet material is made from a nonwoven fiber fabric.

* * * * *